United States Patent

[15] 3,675,198

Drown

[45] July 4, 1972

[54] VEHICLE TIRE AIR PRESSURE MONITORING SYSTEM

[72] Inventor: George C. Drown, Fort Dodge, Iowa

[73] Assignee: Leward M. Larson, Fort Dodge, Iowa; a part interest

[22] Filed: Aug. 25, 1970

[21] Appl. No.: 66,690

[52] U.S. Cl............................................340/58, 200/61.25
[51] Int. Cl.................................................B60c 23/04
[58] Field of Search.................340/52, 58; 200/61.22, 61.25

[56] References Cited

UNITED STATES PATENTS

| | | | |
|---|---|---|---|
| 2,258,384 | 10/1941 | Harrington | 200/61.25 |
| 2,494,831 | 1/1950 | Phelps | 200/61.25 |
| 2,794,876 | 6/1957 | Phelps | 200/61.25 |
| 2,033,424 | 3/1936 | Gieskieng | 340/58 |
| 2,669,876 | 2/1954 | Lentz | 340/58 X |
| 3,370,459 | 2/1968 | Cescati | 340/58 X |
| 3,377,851 | 4/1968 | Beavers et al. | 340/58 X |

*Primary Examiner*—Alvin H. Waring
*Attorney*—Zarley, McKee & Thomte

[57] ABSTRACT

A monitoring electrical circuit includes either a pressure gauge or signal light on the dashboard of an automobile for each of the tires on the vehicle and the circuit includes a pressure responsive switch on each of the wheels. The electrical circuit in each of the front wheels includes a terminal on the outer end of the front axle frictionally engaged by an electrically conductive spring held in and insulated from an enclosure cover rotatable with the front wheel. The electrical circuit through the rear wheels involves a conductive ring on the axle at each wheel engaged at its periphery by a carbon brush held stationary on the axle housing. The air pressure signalling units on the wheels are positioned parallel to the axis of rotation of the wheels such that they are unaffected by the centrifugal forces generated by the wheels when turning.

10 Claims, 7 Drawing Figures

Patented July 4, 1972  3,675,198
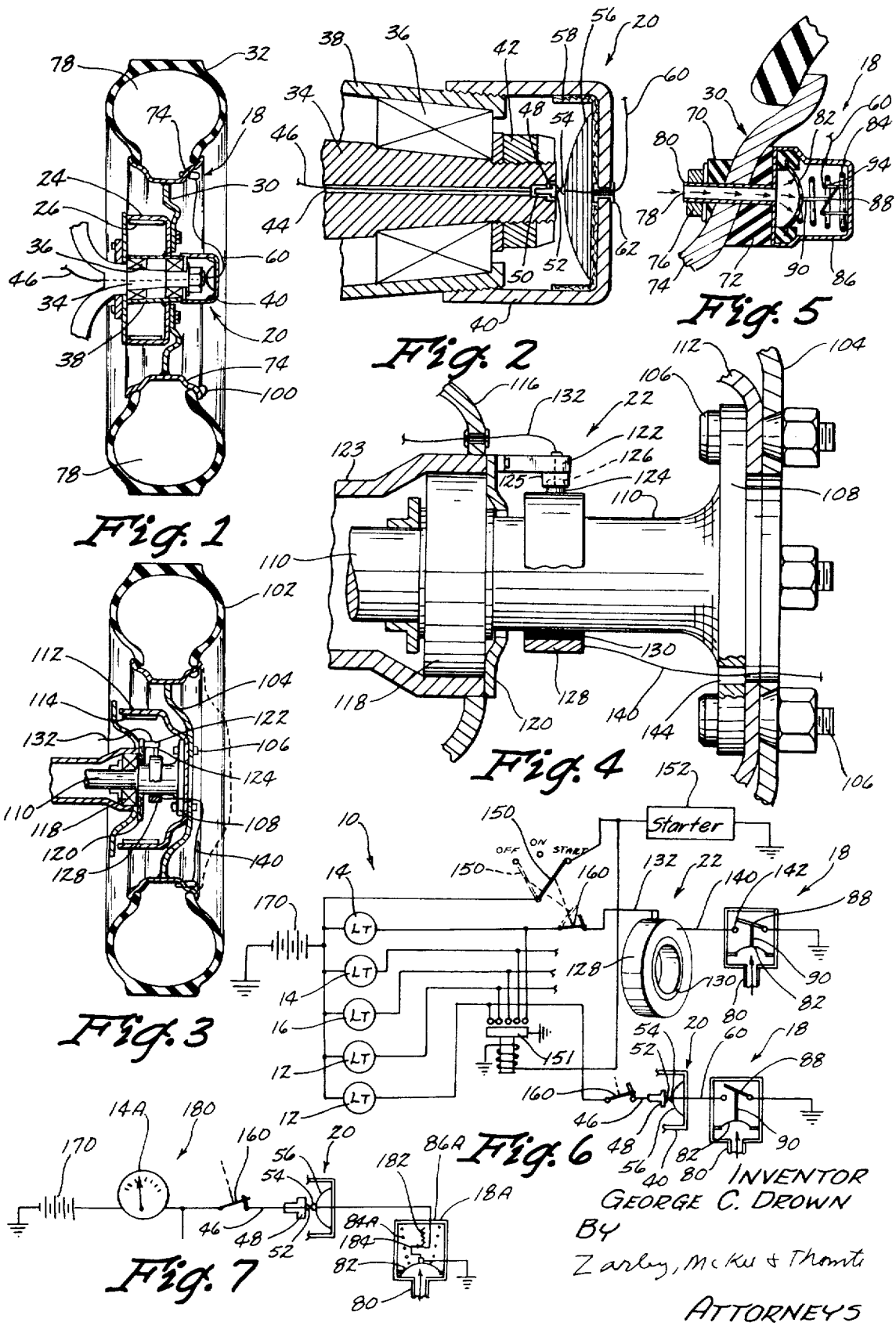
INVENTOR
GEORGE C. DROWN
BY
Zarley, McKee & Thomte
ATTORNEYS

VEHICLE TIRE AIR PRESSURE MONITORING SYSTEM

The cause of many highway accidents can be traced to improperly inflated tires. The manual checking of the tire inflation pressure is time consuming and too infrequently performed. The loss of tire pressure while the vehicle is moving will usually go undetected until after it is too late. The tire pressure monitoring system of this invention will provide either continuous monitoring of the tire pressure for each tire as accurately as desired or will actuate signalling lights when a dangerously low predetermined air pressure has been reached by any of the tires.

One of the difficult problems in monitoring the pressure of vehicle tires is in establishing a reliable electrical circuit through the rotating wheels. The monitoring circuit of this invention involves a foolproof electrical circuit for both the front and rear wheels which will not only be reliable for transmitting air pressure information it will also indicate for both of the front and rear wheels the presence of defective wheel bearings by grounding the circuit at the front and rear axles and thereby turning on the associated warning light.

The signalling units on the wheels are so positioned parallel to the axis of rotation for the wheels that the centrifugal forces developed as the wheels rotate do not affect the signalling unit sensitivity.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a cross-sectional view of a front wheel illustrating the associated air pressure signalling unit and electrical circuitry;

FIG. 2 is an enlarged fragmentary cross-sectional view of the front wheel axle and enclosure rotatable with the wheel;

FIG. 3 is a cross-sectional view similar to FIG. 1 but showing the rear wheel construction;

FIG. 4 is an enlarged fragmentary view of the rear wheel construction;

FIg. 5 is enlarged cross-sectional fragmentary view of the pressure signalling unit mounted horizontally in a wheel;

FIG. 6 is an electrical schematic drawing of the electrical monitoring system circuitry; and FIG. 7 is an alternate embodiment of the electrical circuitry showing a pressure signalling gauge.

The vehicle tire pressure monitoring system of this invention is referred to generally in FIG. 6 by reference numeral 10 and includes signal lights 12, 14 and 16 for the front, rear and spare tires respectively. A air pressure signalling unit 18 is provided on each of the wheels and makes an electrical circuit through front and rear wheel brush units 20 and 22, respectively.

The front wheel structure is best seen in FIGS. 1 and 2 and includes a brake drum 24 having a brake shoe 26. A brake drum 24 is secured by bolts 28 to the front wheel 30 on which a tire 32 is mounted. The wheel spindle 34 is provided with bearings 36 in a wheel hub 38 secured to the brake drum 24. A dust or grease cap or enclosure cover 40 is threadably secured to the hub to enclose the outer end of the spindle 34 and the wheel bearings held in place by an adjusting nut 42.

A bore or passageway 44 extends through the spindle and an insulated conducter wire 46 extends therethrough and terminates in a button 48 seated in an insulator 50 on the axial center of the spindle 34. A bead 52 is provided directly on the axial center of the button 48 and is adapted to engage a bead 54 at the apex of a conically shaped coil spring 56 seated in the grease or dust cover 40 and insulated by an insulator 58. An insulated conductor wire 60 extends through a grommet 62 in the enclosure cover 40 and is connected to the spring 56 thereby making electrical contact between the rotating wire 60 on the wheel 30 and the stationary wire 46 in the spindle 34. When the front wheel is properly assembled with nondefective wheel bearings 36 the spring 56 will maintain yieldable frictional contact between the bead 54 thereon and the bead 52 on the button 48 in the outer end of the spindle 34. Upon looseness developing in the front wheel due to bearing wear the bead 54 on the spring 56 will slip over out of axial alignment with the bead 52 and contact the spindle 34 thereby grounding the circuit through the corresponding signal light 12.

The signalling unit 18 mounted in the wheel 30 is shimmed by the beveled oppositely disposed mounting shims 70 and 72 on the annularly disposed wheel flange 74 such that the signalling unit 18 is horizontally oriented to eliminate any affect thereon due to centrifugal forces developed during the rotation of the wheel. An adjustment nut 76 on the inside of the air chamber 78 holds the signalling unit 18 in place. A passageway 78 is provided through a sleeve 80 in communication with a diaphragm 82 against which a spring 84 bears. The spring 84 is held in place by a cover 86. A switch element 88 is yieldably held in an open position as seen in FIG. 5 by the air pressure on the diaphragm 82 which also bears against a pin 90 connected to the switch element 88. Upon the air pressure against the diaphragm 82 being reduced the pin 90 and switch element 88 will move to the left as seen in FIG. 5 and the switch element 88 will bear against the terminal 94 connected to the insulated wire 60 thereby completing the circuit through the associated signal light 12.

The air pressure signalling unit 18 will imbalance the front wheel 32 and thus a counterbalance weight 100 is provided diametrically opposite on the wheel flange 74.

A rear tire 102 is shown in FIG. 3 mounted on a wheel 104 secured by bolts 106 to the flange 108 of the rear drive axle shaft 110. A brake drum 112 is also secured on the shaft flange 108 and includes a brake shoe 114 enclosed in the brake drum adjacent to a back plate 116. The axle shaft 110 is mounted in wheel bearings 118 held in place by an outer bearing retainer 120.

An arm 122 is secured to the outer retainer 120 in turn stationary and secured to the back plate 116 on the axle shaft housing 123. A carbon brush 124 is biased by a spring 126 in a brush holder 125 toward a conductor ring element 128 mounted on the axle shaft 110 and insulated by a ring element 130. An insulated wire 132 extends through a grommet 134 in the back plate 116 and is operatively connected to the associated signal light 14. Similarly, an insulated wire 140 extends from the conductor ring 128 and through an opening 144 in the shaft flange 108 and thence through the break shoe 112 and the wheel 104 to where it is connected to a terminal 142 in the air pressure signalling unit 18 hereinbefore described with reference to the front wheel 30. Defective rear wheel bearings will cause brush holder 125 on the arm 122 to be grounded out against the ring 128 and thereby activate the associated signal light.

The vehicle air pressure monitoring system circuitry as illustrated in FIG. 6 also includes a testing circuitry to check the signal lights 12, 14 and 16 such that when the ignition switch 150 is moved to the start position a circuit through the starter 152 and the lights 12, 14 and 16 is closed by the ralay 151. Accordingly, at this time if the lights are operative they should light. Upon return of the ignition key to the on position the lights should go out and only again be relit upon one of the tires being deflated to a predetermined pressure which would cause the pressure signalling units 18 to close the electrical circuit. In the case of either a front or rear wheel bearing becoming defective the circuit will be grounded and closed thereby lighting the signal lights. Each of the lights 12, 14 and 16 include a switch 160 operated with the ignition switch 150 such that when the ignition switch 150 is in the dash line off position the signal lights will be inoperative and thereby avoid running the vehicle battery 170 down.

An alternate circuit 180 is shown in FIG. 7 which will enable precise readings in pounds to be registered on a signalling indicator 14A connected through the switch 160 and the switches 20 or 22 for the front and rear wheels respectively to the air pressure signalling unit 18A. The air pressure signalling unit 18A includes a sleeve 80 exposed to the air pressure of the tire and pressing against a diaphragm 82 against which a spring 84A bears. The spring 84A is held in place by an enclosure cover 86A. A resistance element 182 is engaged by a movable terminal 184 carried on the diaphragm 82 such that the voltage drop across the pressure signalling unit 18A will vary with the amount of resistance put into the circuit as a result of the air pressure in the tire. The greater the air pressure in the tire the less the resistance in the circuit will be and accordingly the gauge 14A will register a higher pressure. Conversely, as the pressure in the tire is reduced a greater amount of resistance will be introduced into the circuit thereby reducing the strength of the signal to the pressure gauge 14A.

It is thus seen that a continuous simple and foolproof monitoring system has been provided for monitoring the air pressure of front, rear and spare tires on any vehicle. Additionally, wheel bearing problems in the wheels will be detected. The speed of the wheel rotation will not affect the sensitivity of the monitoring system. The signalling indicators may be either on or off lights or pressure gauges to give precise readings of the air pressure in the tires. The signal indicators may be tested each time the vehicle ignition key is moved to the start position to verify that the lights or gauges are operative. The air pressure monitoring system may be used on existing cars with few chanGes in the existing structure being required or may be incorporated into vehicles at the plant. The electrical connections in both the front and rear wheels are enclosed and protected from dust and moisture and should be nearly maintenance free. The system of this invention is equally adapted for use on vehicles having either brake shoes or disc brakes.

I claim:

1. A tire pressure and wheel bearing monitoring system comprising,
    a vehicle having front and rear wheels and tires,
    a vehicle front wheel air pressure signalling unit on said front wheel rotatable therewith and in communication with the interior of said vehicle front tire,
    a stationary front axle having a rotatable wheel hub mounted thereon, an outer end portion of said axle being exposed outwardly of said wheel hub, an enelosure cover carried on said hub and extending over said outer end portion,
    an insulated electrical contact axially recessed in said outer end of said axle and an electrically conductive spring positioned in and insulated from said cover and frictionally and yieldably engaging said contact, said spring being operatively connected to said signalling unit,
    an indicator electrically connected to said air pressure signalling unit in an electrical circuit including an electrical power supply, said contact and said spring whereby variations in the front tire air pressure are indicated on said indicator, and
    said spring being positioned closely adjacent said outer end of said axle such that upon said electrical contact in said outer end of said axle and said conductive spring becoming disaligned said conductive spring will electrically contact said outer end of said axle and said contact and said indicator will be activated by a circuit being established through said axle, contact and spring.

2. The structure of claim 1 wherein said air pressure signalling unit is positioned with its longitudinal axis parallel to the axis of rotation of said front wheel thereby being unaffected by centrifugal forces as said front tire is rotated.

3. The structure of claim 1 wherein said contact on said outer end of said axle is further defined as being connected to an insulated wire extending through an axial bore in said axle.

4. The structure of claim 1 wherein said air pressure signalling unit includes a variable electrical resistance responsive to a diaphragm exposed to the air pressure of said front tire.

5. The structure of claim 4 wherein said indicator unit is electrically responsive to the voltage across it and is connected in series to said signalling unit.

6. The structure of claim 5 wherein said indicator is further defined as being in a second circuit including said electrical power source and an ignition switch, said ignition switch having one position for closing said second circuit through said indicator.

7. A tire pressure and wheel bearing monitoring system comprising,
    a vehicle having front and rear wheels and tires,
    a vehicle rear wheel air pressure signalling unit on said rear wheel rotatable therewith and in communication with the interior of said rear tire,
    a rotatable rear wheel axle having a housing, said wheel and tire mounted on said axle and adapted to turn therewith,
    an electrically conductive ring on said axle rotatable therewith and insulated therefrom by insulation means,
    a stationary brush in a brush holder on said housing frictionally and yieldably engaging the top exterior of said ring, said ring being operatively connected to said signalling unit,
    an indicator electrically connected to said air pressure signalling unit in an electrical circuit including an electrical power supply, said ring and said brush whereby variations in the rear tire air pressure are indicated on said indicator, and
    said brush holder being closely spaced to the exterior of said ring such that upon said rear axle moving closer to the top of said housing, said ring will electrically engage said brush holder and said indicator will be activated by a circuit being established through said housing, brush holder and brush.

8. The structure of claim 7 wherein said air pressure signalling unit is positioned with its longitudinal axis parallel to the axis of rotation of said rear wheel thereby being unaffected by centrifugal forces as said rear tire is rotated.

9. The structure of claim 1 and a vehicle rear wheel air pressure signalling unit on said rear wheel rotatable therewith and in communication with the interior of said rear tire, a rotatable rear axle having a housing, said wheel and tire mounted on said axle and adapted to turn therewith, an electrically conductive ring on said axle rotatable therewith and insulated therefrom by insulation means, a stationary brush in a brush holder on said housing frictionally and yieldably engaging the top exterior of said ring, said ring being operatively connected to said signalling unit, and a second indicator electrically connected to said air pressure signalling unit in an electrical circuit including an electrical power supply, said ring and said brush whereby variations in the rear tire air pressure are indicated on said second indicator, and said brush holder being closely spaced to the exterior of said ring such that upon said rear axle moving closer to the top of said housing said ring will electrically engage said brush holder and said second indicator will be activated by a circuit being established through said housing, brush holders and brush.

10. The structure of claim 9 wherein said air pressure signalling units are oriented in such a manner parallel to the axis of rotation of the associated wheel that centrifugal forces generated during rotation of said wheels do not affect the operation of said signalling units.

* * * * *